*INVENTORS.*
JOHN R. KOBBE
CLIFFORD H. MOULTON
JOHN V. ROGERS
CHESTER N. WINNINGSTAD
*BY*
*BUCKHORN, CHEATHAM & BLORE*
*ATTORNEYS*

*INVENTORS.*
JOHN R. KOBBE
CLIFFORD H. MOULTON
JOHN V. ROGERS
CHESTER N. WINNINGSTAD
*BY*
*BUCKHORN, CHEATHAM & BLORE*
*ATTORNEYS*

United States Patent Office 3,248,655
Patented Apr. 26, 1966

3,248,655
RATCHET MEMORY CIRCUIT AND SAMPLING SYSTEM EMPLOYING SUCH CIRCUIT

John R. Kobbe, Beaverton, and Clifford Harold Moulton, John V. Rogers, and Chester N. Winningstad, Portland, Oreg., assignors to Tektronix, Inc., Beaverton, Oreg., a corporation of Oregon Filed May 7, 1962, Ser. No. 192,806
12 Claims. (Cl. 328—15)

The subject matter of the present invention relates generally to electrical circuits for sampling different portions of repetitive high frequency input signals and storing the sample portions to produce a low frequency output signal having substantially the same waveforms as such input signals, and in particular to a sampling circuit including a ratchet memory circuit whose storage of electrical signals is cumulative.

The ratchet memory circuit of the present invention has utility whenever it is desired to add increments to or subtract increments from a previously stored electrical value and has particular utility when employed as the memory circuit for incremental waveform samples of a repetitive signal being sampled in a sampling type of cathode ray oscilloscope. The operation of such a sampling oscilloscope is discussed in co-pending U.S. patent application, Serial No. 131,647, filed August 15, 1961, by John V. Rogers, entitled, Pulse Generator Circuit. A sampling oscilloscope reproduces the waveform of a repetitive high frequency input signal applied to the input of the sampling system as an output signal of much lower frequency but having substantially the same waveform as such input signal, to enable such waveform to be displayed on the cathode ray tube of such oscilloscope. This is accomplished by taking a sample of a different portion of the input signal waveform from a different one of a plurality of successive input signals, storing such samples and combining them together to form the output signal.

Briefly, the ratchet memory circuit of the present invention employs an operational amplifier including a Miller integrator type of memory amplifier. Such an amplifier has a capacitor feedback connected from the output end of the memory amplifier to the input end of such memory amplifier. The operational amplifier also includes an input coupling capacitor for supplying input signal pulses to the input end of the memory amplifier so that the gain of the operational amplifier is equal to the capacitance of the input coupling capacitor divided by the capacitance of the feedback or memory capacitor. A memory gate is connected between the input coupling capacitor and the input end of the memory amplifier in order to control the charging and discharging of the memory capacitor through such coupling capacitor by the opening and closing of such gate. The circuit may also provide for discharging the input capacitor when the memory gate is closed and no input signal pulse is being supplied to such input gate so that the memory circuit is conditioned for the reception of another input signal pulse.

When the ratchet memory circuit of the present invention is employed in a sampling oscilloscope, a feedback circuit is connected from the output end of the operational amplifier to the sampling circuit in order to compare the output signal of the ratchet memory circuit with a portion of a subsequent signal waveform being sampled to determine whether such portion is greater or less than the amplitude of the immediately preceding sampled portion, so that such portion of the subsequent signal waveform sampled can be employed to cause an increase or decrease of the charge stored in the memory capacitor of the operational amplifier to thereby cause a corresponding increase or decrease in the output signal when the memory gate is opened. Whether such charge is increased or decreased depends upon whether such portion of the subsequent waveform being sampled is greater or lesser in amplitude, respectively, than the ratchet memory output signal fed back to the sampling circuit. The ratchet memory circuit of the present invention is thus a cumulative memory circuit whose output signal remains at the level set by a preceding input signal pulse. To change the output signal to another level it is only necessary that the next input signal pulse be equal to the difference between the stored level and such other level so that each input signal pulse need not have an amplitude equal to the desired output level. Also the output signal can be either positive or negative and the input signal pulses can also be either positive or negative. The input signal pulses are added algebraically to the output signal so that the Miller integrator circuit is either a "run up" or "run down" type of integrator circuit with respect to any output signal level within wide limits of output signal levels.

The ratchet memory circuit of the present invention is simpler in structure and operation than previously suggested circuits for performing a similar operation. For example, one memory gate only is required to control the charging and discharging of the memory capacitor whereas two were employed in such previously suggested circuits. Also the memory circuit of the present invention has greater stability and accuracy than the previously suggested circuits. In addition, this new ratchet memory circuit has a very low output impedance so that it can furnish substantial amounts of signal power to subsequent circuits and for feedback to the sampling circuit of a sampling oscilloscope.

An object of the present invention is, therefore, to provide an improved ratchet memory circuit in which an operational amplifier having a memory capacitor feedback is employed to provide an output signal which is the sum of input pulses and which remains at a constant value in the absence of an input pulse.

Another object of the invention is to provide an improved ratchet memory circuit in which an operational amplifier having a memory capacitor connected in a feedback loop from the output end to the input end of a memory amplifier, and an input coupling capacitor, is employed along with a memory gate which controls the charging and discharging of such memory capacitor through such coupling capacitor to provide an output signal which is the algebraic sum of input signals admitted through such gate.

A further object of the present invention is to provide an improved ratchet memory circuit in which a Miller integrator type of operational amplifier including a memory capacitor and an input coupling capacitor are employed so that the charging of its memory capacitor is controlled by a memory gate between such capacitors to provide a cumulative memory having an output signal which can be compared through a feedback circuit with an input signal to derive signal difference input pulses which are delivered to the memory capacitor through such input capacitor and memory gate.

Still another object of the present invention is to provide an improved electrical signal sampling circuit in which an operational amplifier having a memory capacitor feedback is employed as part of a ratchet memory circuit to provide an output signal of the same waveform as a signal being sampled but at a lower frequency.

Additional objects and advantages of the present invention will become apparent from the following detailed description of preferred embodiments thereof shown in the attached drawings, of which:

Figure 1:
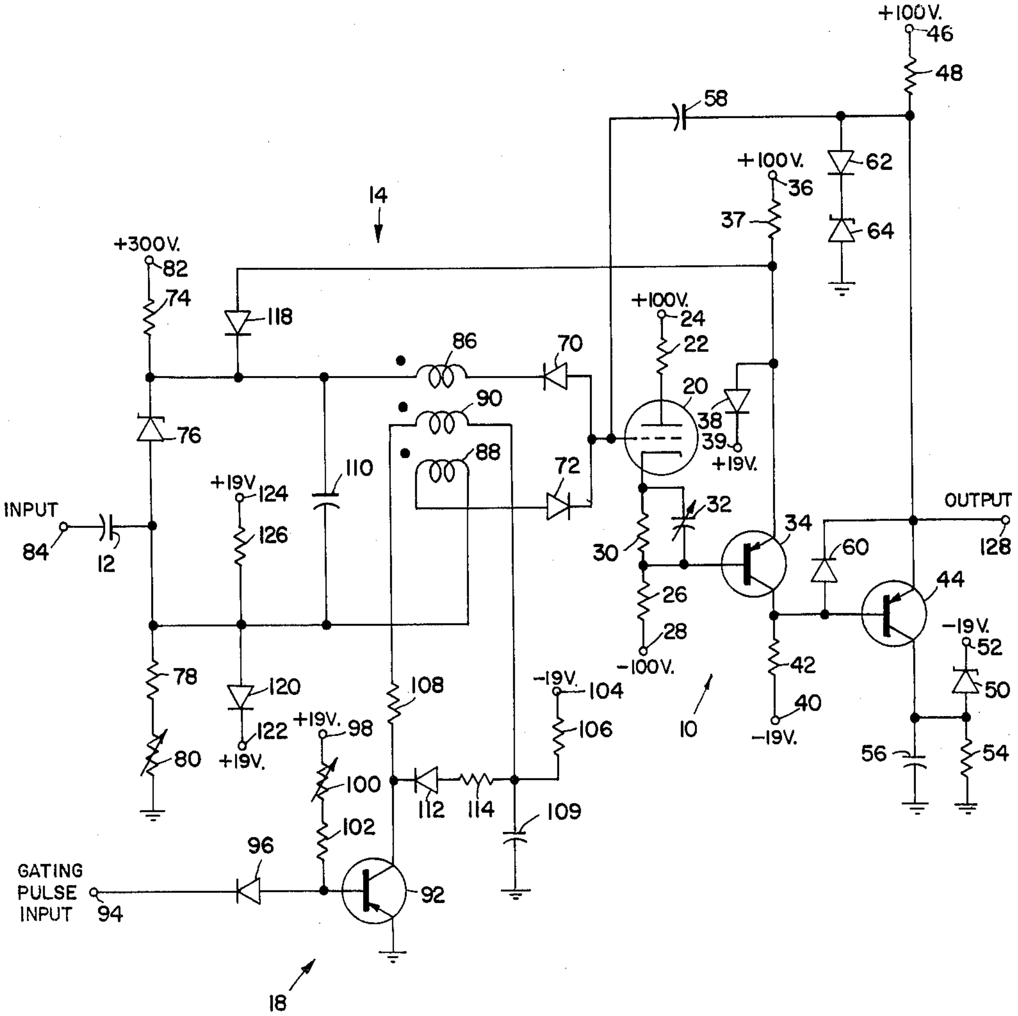
FIG. 1 is a schematic diagram of a ratchet memory circuit in accordance with one embodiment of the present invention.

One embodiment of the ratchet memory circuit of the present invention is shown in FIG. 1 as including a Miller integrator type of memory amplifier 10 along with a coupling capacitor 12 to provide an operational amplifier. A memory gate 14 is connected between such coupling capacitor and the input end of the memory amplifier 10. Input pulses are delivered to the Miller integrator through the input capacitor 12 and memory gate 14. Such pulses may be difference signals derived by comparing the output of the ratchet memory circuit with portions of a signal being sampled as discussed below with respect to FIG. 3. The ratchet memory circuit also includes a memory gate driver amplifier 18 which is transformer coupled to the memory gate 14.

The amplifier 10 includes an input vacuum tube 20, such as a triode, connected as a cathode follower and having a parasitic oscillation suppressing resistor 22 connected to its plate and at 24 to a source of positive D.C. plate voltage. A cathode load resistor 26 is connected at 28 to a source of negative D.C. voltage and to the cathode of input tube 20 through a high frequency compensation network, consisting of a resistor 30 connected in parallel with a variable capacitor 32. Also included in the memory amplifier 10 is a transistor 34 of the PNP type connected as a common emitter amplifier. Thus the transistor 34 has its base connected to the cathode of tube 20 through the resistor 30 and capacitor 32 and has its emitter connected at 36 to a source of positive D.C. voltage through a resistor 37. Such transistor also has its collector connected at 40 to a source of negative D.C. bias voltage through a load resistor 42. A diode 38 having its cathode connected at 39 to a source of lower D.C. voltage maintains the voltage on the emitter of the transistor 34 at such lower voltage. As discussed later the diode 38 also forms part of an input signal voltage limiting circuit.

The output of the common emitter amplifier transistor 34 is connected to the base of an output transistor 44 of PNP type whose emitter is connected at 46 to a source of positive D.C. emitter voltage through a load resistor 48 so that such output transistor functions as an emitter follower. The collector of output transistor 44 is connected to a source of substantially constant negative voltage by means of a Zener diode 50. Such diode has its cathode connected at 52 to a source of negative voltage and its anode connected to ground through a resistor 54 so that the D.C. voltage supplied to the collector of the transistor 44 is substantially constant. The resistor 54 is A.C. bypassed to ground by a capacitor 56.

A memory capacitor 58 is connected as a feedback capacitor between the emitter of the emitter follower transistor 44 at the output end of the Miller integrator amplifier 10 and the grid of vacuum tube 20 at the input end of such amplifier. This memory capacitor holds the voltage of the grid of the tube 20 at the algebraic sum of the voltage of the emitter of the transistor 44 and the voltage across the capacitor 58. Since the feedback is negative and the capacitor 58 can not be charged or discharged when the gate 14 is closed the voltages on such grid and emitter remain constant when the gate 14 is closed. When the gate 14 is opened and a pulse is transmitted therethrough to charge or discharge the capacitor 58, the voltage of the grid of the tube 20 changes very little and signals are developed across the load resistor 48 which are very nearly equal to the change in voltage across the capacitor 58 due to the change in charge thereon. This results from the amplification produced by the transistors 34 and 44. Large voltage swings can thus be produced across the resistor 48. In the case of a positive voltage applied to the base of the transistor 34, its collector goes negative to cause increased current flow through transistor 44 and resistor 48 and the production of a negative going voltage on the emitter of transistor 44. In the case of a negative going voltage applied to the base of the transistor 34, the collector of such transistor goes positive by reason of increased current flow through resistor 42. This positive going signal is not transmitted from the base to the emitter of transistor 44 with sufficient speed for proper operation of the ratchet memory circuit. Therefore, a diode 60 is connected between the base and emitter of transistor 44 to speed up the charging of memory capacitor 58 by positive output signals. The result is a high gain amplifier operating at a low average power since substantial current flows through one transistor 34 or 44 only at any time and very little current flows through either under zero signal conditions. The output voltage swing of the Miller integrator 10 is limited in a positive direction by a diode 62 whose anode is connected to the emitter of the transistor 44 and whose cathode is connected to ground through a Zener diode 64. Such Zener diode sets this upper limit of positive output voltage. The negative output voltage is limited by reason of a relatively low negative voltage supply connected to the output transistor 44.

The memory gate 14 which controls the operation of the memory amplifier 10 includes a pair of gating diodes 70 and 72 having their anode and cathode, respectively, connected to the memory capacitor 58 and also to the grid of vacuum tube 20 so that gating diode 70 can transmit only negative input signals and gating diode 72 can only transmit positive input signals for varying the charge on the memory capacitor. These gating diodes are normally both reverse biased by a voltage divider including resistor 74 connected in series with a Zener diode 76, a fixed resistor 78 and a variable resistor 80, such voltage divider having one end connected at 82 to a source of positive D.C. voltage and its other end connected to ground. The D.C. voltage across the Zener diode 76 remains constant to maintain the total voltage across gating diodes 70, 72 constant. Such diodes are preferably selected so that the latter voltage is half-way between the two positive D.C. voltages at the cathode and anode of Zener diode 76. It should be noted that the grid of vacuum tube 20 remains at substantially the same voltage regardless of the input signal because the input voltage of the Miller integrator can not change due to the large degenerative feedback provided by capacitor 58.

Resistors 78 and 80 must be of small enough resistance to allow the charging and discharging of input coupling capacitor 12 to return the input voltage to the gate to a constant average voltage while the gate 14 is closed. Such capacitor 12 is connected between the anode of Zener diode 76 and the input terminal 84 of the ratchet memory circuit. Since gating diodes 70 and 72 are normally reversed biased, an input signal applied to input terminal 84 and transmitted through coupling capacitor 12 will not pass through the memory gate 14 to the Miller integrator 10. In order to remove this reverse bias voltage on gating diodes 70 and 72 and thus open the gate 14, such diodes are each connected in series with a separate secondary winding 86 and 88, respectively, of a transformer having a primary winding 90 connected in series with the collector circuit of a PNP driver transistor 92 forming part of the memory gate driver amplifier 18. The base of the driver transistor 92 is connected to a gating pulse input terminal 94 through a coupling diode 96 which transmits only negative going gating pulses. The base of the driver transistor 92 is connected at 98 to a source of positive D.C. voltage through a variable resistor 100 and a fixed resistor 102 to apply a reverse bias voltage on the base of such transistor so that it is normally nonconducting. The emitter electrode of driver transistor 92 is connected to ground while the collector electrode of such transistor is connected at 104 to a source of negative D.C. voltage through a load resistor 106, primary winding 90, and a bias resistor 108, with the collector voltage source being decoupled by a bypass capacitor 109.

When a negative gating pulse is applied to the base of driver transistor 92 this transistor is rendered conducting and is driven into saturation so that an amplified positive gating pulse appears upon its collector whose width is determined by the storage time of the driver transistor. The current of such amplified gating pulse flows through the primary winding 90 to produce voltages in the secondary windings 86 and 88 by transformer action. These voltages are additive and in a direction to forward bias the diodes 70 and 72 and cause a forward current to flow therein. A coupling capacitor 110 is connected across the two secondary windings 86 and 88 to provide a low impedance path for such current. This opens the memory gate 14 and allows any input pulse which is delivered through the input coupling capacitor 12 to be transmitted through such gate to charge or discharge the memory capacitor 58. The gate 14 closes by termination of the gating pulse supplied thereto before the input signal pulse terminates. It should be noted that the current of the input signal pulse flows in opposite directions through the secondary transformer windings 86 and 88 so that such windings provide a low impedance circuit for such pulse.

After the negative gating pulse applied to the base of driver transistor 92 has terminated, such transistor again becomes nonconducting, and the current flow in primary winding 90 begins to decrease to zero. The resulting decrease of magnetic flux in the transformer core induces a voltage in primary winding 90 having a polarity which is the same as that of the original applied voltage. This induced voltage tends to greatly increase the negative voltage applied to the collector of the driver transistor 92 over its normal reverse bias voltage and tends to cause breakdown of the transistor. A bypass diode 112 having its cathode connected to the collector of such driver transistor and its anode connected through a resistor 114 to the other side of primary winding 90 effectively short circuits such induced voltage.

The voltage swing of the input signal applied to the gating diodes 70 and 72 of memory gate 14 is limited by diodes 118 and 120. In the circuit shown the voltage at the grid of the tube 20 remains very nearly constant at +19 volts. The Zener diode 76 maintains a fixed voltage of 6 volts between its terminals which means that the zero signal voltage at the cathode of gating diode 70 is +22 volts and the zero signal voltage at the anode of gating diode 72 is +16 volts thus producing a zero signal reverse bias of 3 volts on each of gating diodes 70 and 72. Since the anode of limiting diode 118 is connected to a constant positive voltage of +19 volts provided by diode 38, the diode 118 also has a zero signal reverse bias of 3 volts. Negative going signals of greater than 3 volts transmitted through the Zener diode 76 are thus limited to 3 volts by the diode 118. The limiting diode 120 has its cathode connected at terminal 122 to a 19 volts source of positive D.C. reference voltage, and has its anode connected to the anode of gating diode 72 and to a 19 volt source of positive D.C. voltage at terminal 124 through a resistor 126 so that such second limiting diode is also normally D.C. reversed biased by approximately 3 volts. Positive going signals of greater than 3 volts are thus limited to 3 volts by the diode 120. It is to be noted that the pulse signal limiting diodes 118 and 120 are necessary only when the memory gate 14 is closed. When such gate is closed, substantially the full voltages of pulses reaching the coupling capacitor 12 are applied to the gate 14 as the gate presents a high impedance. The limiting diodes limit any such voltage to one which will not override the 3 volts reverse bias on either gate diode 70 or 72.

When the gate 14 is opened as discussed above by applying a forward bias to the gate diodes 70 and 72 through the transformer windings 86 and 88, such diodes and the windings referred to have low impedance. The impedance of input to the Miller memory circuit is substantially zero since the voltage at that point does not vary materially. This means that the input pulse voltage throughout the gate circuits is very low and that the pulses transmitted through the gate are current pulses.

The ratchet memory circuit of FIG. 1 will add current pulses to or subtract current pulses from any charge on the memory capacitor 58 depending upon the polarity of such charge and the polarity of the pulses. Current pulses in one direction will be added to a positive charge and subtracted from a negative charge and the reverse is true of current pulses in the opposite direction. Any charge added to or subtracted from the charge on the capacitor 58 will cause a corresponding change in the output voltage of the Miller memory circuit. The output voltage from the ratchet memory circuit will thus be in the form of a stairstep voltage waveform which can "run up" or "run down" within the range of the circuit, from any previous value of the output voltage. The steps need not be of uniform size and the output voltage remains substantially constant in the absence of input pulses.

Figure 2:
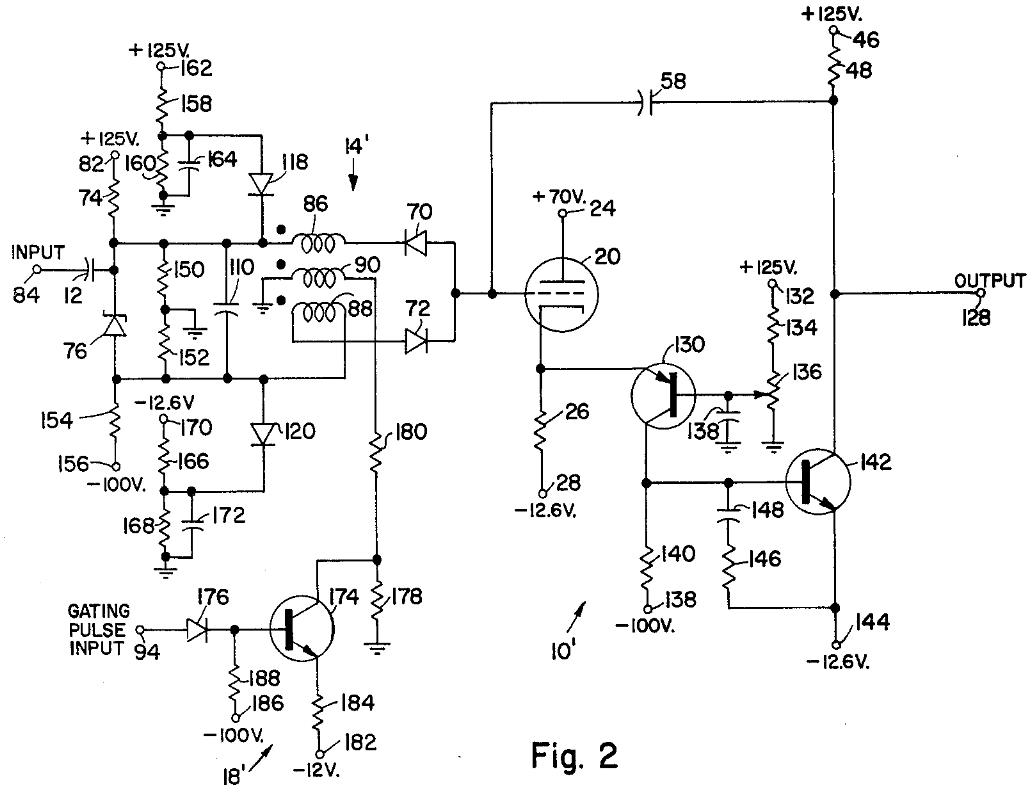
FIG. 2 is a schematic diagram of another embodiment of the ratchet memory circuit of the present invention.

A second, more simplified embodiment of the ratchet memory circuit of the present invention is shown in FIG. 2 as also including a Miller integrator type of memory amplifier 10′, and a coupling capacitor 12′, a memory gate 14′, and a memory gate driver 18′. Since the embodiment of the ratchet memory circuit of FIG. 2 operates in a similar manner to that circuit already described with reference to FIG. 1, only the differences between the two ratchet memory circuits will be described. In the Miller integrator 10′ of FIG. 2, the input vacuum tube 20 has its cathode connected to the emitter of a common base connected transistor 130, which may be of a PNP type. This transistor 130 has its base connected at 132 to a source of positive D.C. voltage through a voltage divider including a fixed bias resistor 134 and a potentiometer 136 which has one side connected to ground and its movable contact connected to such base. An A.C. bypass capacitor 138 is connected from the moving contact of potentiometer 136 to ground. The collector of transistor 130 is connected at 138 to a source of negative D.C. voltage through a load resistor 140. The output signal from such transistor is applied to the base of an output transistor 142 which is connected as a common emitter amplifier. The output transistor 142 has its emitter connected at 144 to a source of negative bias voltage and its base also connected to such source through a resistor 146 and blocking capacitor 148. It should be noted that no bypass diode is connected across output transistor 142 for shunting positive signals around such transistor, as was done in the embodiment of FIG. 1, so that both positive and negative signals are amplified by such output transistor.

The memory gate 14′ of FIG. 2 differs from the memory gate 14 of FIG. 1 in that the reverse bias voltage is applied to gating diodes 70 and 72 by a circuit including a pair of series connected bias resistors 150 and 152, respectively, connected in parallel with the Zener diode 76. The resistors 150 and 152 have their common connection grounded. The remainder of the circuit is such that a positive D.C. bias voltage is developed across resistor 150 and a negative D.C. bias voltage is developed across resistor 152. Thus the negative D.C. bias voltage across resistor 152 is supplied through a resistor 154 connected at 156 to a source of negative D.C. voltage, while the positive D.C. bias voltage of bias resistor 150 is supplied through the resistor 75 connected at 82 to a source of positive voltage. The total voltage developed across resistors 150 and 152 is set by the Zener diode 76.

The voltage across resistors 150 and 152 also reverse biases limiting diodes 118 and 120 whose anode and cathode, respectively, are each connected to a limiting reference voltage. Thus, the anode of limiting diode 118 is connected to an intermediate point in a voltage divider including a dropping resistor 158 and a biasing resistor 160. The resistor 158 is connected at 162 to a positive D.C. reference voltage and the resistor 160 is connected to ground, with a bypass capacitor 164 being connected across resistor 160. In a similar manner, the cathode of limiting diode 120 is connected to an intermediate point in a voltage divider including a dropping resistor 166 and a bias resistor 168. Such voltage divider has one end connected at 170 to a source of negative D.C. reference voltage and its other end connected to ground, with a bypass capacitor 172 being connected across the resistor 168.

The memory gate driver amplifier 18' of FIG. 2 includes an NPN type of driver transistor 174 whose base is connected to the gating pulse input terminal 94 through a coupling diode 176. Such diode has its anode connected to the input terminal 94 so that it transmits positive gating pulses which are inverted and amplified by driver transistor 174 so that they appear as negative gating pulses on the collector of such transistor. The collector of this driver transistor is connected to ground through a load resistor 178 and in series with the primary winding 90 through a resistor 180. The emitter of the driver transistor 174 is connected at 182 to a source of negative D.C. voltage through an emitter bias resistor 184, while the base of such transistor is connected at 186 to a source of negative D.C. reverse bias voltage through a resistor 188 so that the collector circuit of such driver transistor is normally nonconducting.

Figure 3:
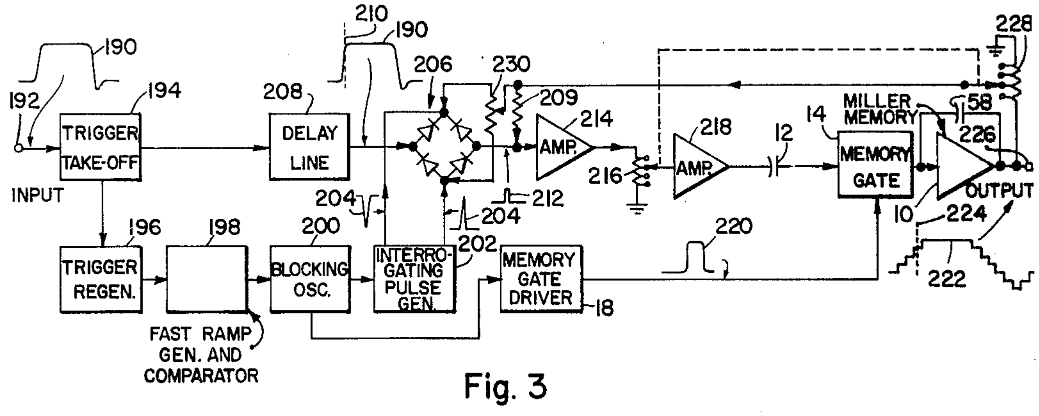
FIG. 3 is a partial schematic and partial block diagram of an electrical signal sampling circuit employing either of the ratchet memory circuits shown in FIGS. 1 and 2.

The general operation of the ratchet memory circuit shown in FIGS. 1 and 2 is best explained with reference to the electrical signal sampling circuit of FIG. 3 which may be used in a sampling type of cathode ray oscilloscope. When a repetitive input signal 190 is applied to the input terminal 192 of the sampling circuit, a portion of this input signal is extracted by a trigger take-off circuit 194 and transmitted to a trigger regenerator circuit 196 where the input signal portion is employed to produce trigger signal pulses having the same time relation to the signal waveforms to be successively sampled. The trigger signal pulses are transmitted to a fast ramp generator and comparator circuit 198 which may be of the type described in the co-pending U.S. patent application, Serial No. 131,647, referred to above. The fast ramp generator delays the successive trigger signal pulses by progressively greater amounts with respect to the waveforms of the input signal being successively sampled so that different portions of such input signal waveforms can be sampled. The output pulses from the fast ramp generator and comparator 198 are transmitted to a blocking oscillator 200 which may be normally nonconducting and is made conducting by each output pulse to generate a gating pulse which is transmitted to the memory gate driver 18 of a ratchet memory circuit, such as shown in FIGS. 1 or 2, and also to an interrogating pulse generator 202.

The interrogating pulse generator may include an avalanche transistor, a snap-off diode or other device that generates a very narrow, fast rising interrogating pulse 204. This interrogating pulse is applied as a positive pulse to one side terminal of a sampling gate 206, and as a negative pulse to the opposite side terminal of such sampling gate in order to forward bias each of four normally reversed biased diodes comprising such sampling gate. The sampling gate 204 is normally closed by a D.C. reverse bias voltage applied to the diodes of such gate through the side terminals mentioned above. The input signal 190 is transmitted to the input end of such gate through a delay line 208, which compensates for any delay of the trigger signal caused by passing through circuits 194, 196, 198, 200 and 202. Such signal cannot normally pass through such sampling gate. When an interrogating pulse 204 is applied to opposite terminals of the sampling gate 206 to open such gate for a short period of time, any difference in voltage between the portion of the input signal then applied to the input end of the gate and a feedback voltage from the output of the Miller integrator applied to the output terminal of the gate 206 through a feedback resistor 209 will produce a sample pulse at the output of the gate. Thus, when the interrogating pulse 204 reaches the sampling gate 206, for example, at the time indicated by the dotted line 210 with respect to the input signal 190, a sample pulse 212 having an amplitude proportional to the difference between the amplitude of the signal waveform at that time and the feedback voltage referred to above is produced at such output side of the gate. The sample pulse 212 is less in amplitude than the difference between such voltages at the input end and the output end of such gate because the sampling efficiency of gate 206 is less than 100%.

The sample pulse 212 is amplified by a first amplifier 214 which can be adjusted to increase the amplitude of the sample pulse so that it is substantially the same as that of the actual difference between the signal voltage and the feedback voltage at the signal portion indicated by the dotted line 210. The amplified sample pulse is transmitted through an attentuator 216, preferably in the form of a step potentiometer. Such attentuator forms part of a control for setting the amount of the vertical deflection of the electron beam in the cathode ray tube of the sampling oscilloscope for a given input signal voltage. The sample pulse from the attentuator 216 is again amplified in a second amplifier 218 and delivered to the coupling capacitor 12 of the ratchet memory circuit of FIGS. 1 or 2. A portion of such sample pulse is then delivered to the memory capacitor 58 through the memory gate 14 when such memory gate is opened by a gating pulse 220 from the memory gate driver 18 under control of the gating signal from the blocking oscillator 200.

The output signal 222 from the Miller memory circuit 10 as indicated by the stairstep waveform is the sum of the total number of difference signal samples needed to reproduce the entire input signal waveform 190. Thus, the effect of the sample pulse 212 on the output signal 222 is shown by the dotted line time mark 224 to be a single positive stairstep. This output signal 222 is transmitted from the output terminal 226 of the sampling circuit shown in FIG. 3 through a vertical amplifier (not shown) to the vertical deflection plates of the cathode ray tube used in the sampling oscilloscope. Also, a portion of the output signal is transmitted to the sampling gate 206 through a feedback loop including the feedback resistor 209 and a second step attentuator 228 which is ganged with the first attentuator 216 and has the correct value of steps so that the overall gain of the feedback loop containing circuits 214, 216, 218, 12, 14, 10, 228 and 209 multiplied by the sampling efficiency of sampling gate 206 is equal to one. For a given sample pulse 212, the amplitude of the portion of the output signal fed back through this second attentuator is thus the same for all settings of the attentuators 216 and 228 although the output signal will vary with the settings of such attentuators. Such portion of the output signal is applied to the gate 206 through the feedback resistors 209 and 230 in order to compare such portion of the output signal of the Miller integrator memory circuit 10 with the portion of the next signal waveform which is sampled. Only the difference between such output signal and such portion of the waveform being sampled produces a sample pulse which is delivered to the amplifier 214. The output voltage 222 of the ratchet memory circuit will thus "run up" or "run down" in discrete stairsteps which may be positive or negative depending on the polarity of the sample pulse provided by sensing the difference between such output voltage and the portion of a signal waveform being sampled. The amplitude of each such stairstep is proportional to the corresponding difference signal. The portion of the output signal fed back through attentuator 228 is also applied through a balancing potentiometer 230 to the terminals of the gate 206 which are connected to the interrogating pulse generator in order to balance the bridge forming such gate.

It will be apparent that various changes may be made in the details of the illustrated preferred embodiments of the present invention without departing from the spirit of the invention. Therefore, it is not intended to limit the scope of he present invention to the above described detailed description of certain preferred embodiments thereof, and it is intended that scope should only be determined by the following claims.

We claim:

1. A sampling circuit for reproducing the wave form of repetitive, high frequency signals at a lower frequency, comprising:

a memory circuit including an integrator amplifier having a memory capacitor connected as a feedback from the output to the input end of said integrator amplifier, and including a coupling capacitor connected to said input of said integrator amplifier and said memory capacitor;

a memory gate connected between said coupling capacitor and said input of said integrator amplifier to control the charging and discharging of said memory capacitor;

means for normally biasing said memory gate nonconducting and for applying a gating pulse to said memory gate to sender said gate conducting for a time determined by the width of said gating pulse; and sampling means including sampling gate means for obtaining sample pulses of different portions of the waveform of a repetitive high frequency input signal, each sample pulse being taken from a different one of successive input signals, and feedback means for comparing the output voltage of said integrating amplifier with the voltage of said sample pulses to produce difference signals and for transmitting said difference signals through said coupling capacitor when said gate is conducting to store said difference signals on the memory capacitor of said integrating amplifier and produce a low frequency output signal having a wave form similar to that of said input signal.

2. A signal sampling circuit for reproducing the waveform of a high frequency signal at a lower frequency, comprising:

ratchet memory means including a Miller integrator circuit having a memory capacitor connected as a feedback from the output to the input of said Miller circuit;

a sampling gate means for producing sample pulses related in voltage to different portions of successive waveforms of a repetitive high frequency input signal applied to said sampling gate, each sample pulse being of the same width and taken from a different one of said waveforms;

a coupling capacitor connected from the output terminal of said sampling gate means to said input of said Miller circuit so that the voltage of said coupling capacitor is changed by said sample pulses;

a memory gate connected between said coupling capacitor and said input of said Miller circuit to control the charging and discharging of said memory capacitor in accordance with the sample voltage produced on said coupling capacitor, said gate including a plurality of diodes;

means for quiescently reverse biasing said diodes by a source of D.C. bias voltage so that said gate is normally closed;

means for applying a gating pulse signal to said memory gate to forwardly bias said diodes and to open said gate for a length of time determined by the width of said gating pulse which is greater than the width of said sample pulse so that said memory capacitor can be charged by the voltage of said sampling pulses to produce a low frequency output signal having a wave form which is similar to that of said input signal; and feedback means including a feedback resistor connected between said output of said Miller circuit and the output terminal of said sampling gate to compare the output signal with the voltage of the input signal and make said sampling pulse related to the difference between said input and output signals so that said output signal may have positive going and negative going portions in its waveform.

3. A ratchet memory circuit for storing electrical signals, comprising:

a hybrid Miller integrator type circuit including a vacuum tube input stage and a transistor output stage and a memory capacitor connected as a feedback impedance from the output to the input of said Miller circuit;

a coupling capacitor connected from the input terminal of said ratchet memory circuit to said input of said Miller circuit;

a memory gate means connected between said coupling capacitor and said input end of said Miller circuit to control the charging and discharging of said memory capacitor, said gate including a plurality of diodes and a biasing resistance;

means for connecting said biasing resistance to said coupling capacitor and to said diodes so that it functions as a timing resistance to charge and discharge said coupling capacitor, as well as a bias resistance to quiescently reverse bias said diodes to render said gate normally closed; and means for applying a gating pulse signal to said memory gate to forwardly bias said diodes and to open said gate for a length of time determined by the width of said gating pulse so that said memory capacitor can be charged by an input signal applied to said input terminal of said ratchet memory circuit.

4. A memory circuit for storing electrical signals, comprising:

an electron discharge device having anode, cathode and grid electrodes connected as a cathode follower amplifier;

a first semiconductor device having emitter, collector and base electrodes connected to the cathode of said electron discharge device;

a second semiconductor device having emitter, collector and base electrodes connected to the collector of said first semiconductor device and to an output load impedance;

a memory capacitor connected from the collector of said second semiconductor device to the grid of said electron discharge device so that said capacitor functions as an input signal storage capacitor;

a coupling capacitor connected between the input terminal of said memory circuit and the grid of said electron discharge device;

a memory gate connected between said coupling capacitor and the grid of said electron discharge device to control the charging and discharging of said memory capacitor, and connected to a source of reverse bias voltage so that said gate is normally closed and does not transmit forward current therethrough; and means to apply a gating pulse signal to said memory gate in order to remove said reverse bias on said gate and open said gate when an input signal is applied to said input terminal of said memory circuit.

5. A ratchet memory circuit for storing electrical signals, comprising:

an electron discharge device having anode, cathode and grid electrodes connected as a cathode follower amplifier;

a first semiconductor device having emitter, collector and base electrodes connected to the cathode of said electron discharge device;

a second semiconductor device having emitter, collector and base electrodes with its base connected to the collector of said first semiconductor device and its emitter-collector circuit connected in series with an output load impedance;

a memory capacitor connected from the collector of said second semiconductor device to the grid of said electron discharge device so that said capacitor functions as an input signal storage capacitor;

a coupling capacitor connected between the input terminal of said memory circuit and the grid of said electron discharge device;

a switching gate connected between said coupling capacitor and the grid of said electron discharge device to control the charging and discharging of said memory capacitor, said gate including a pair of diodes with the cathode of one and the anode of the other of said diodes connected to said grid, and a source of substantially constant reverse bias voltage connected to each of said diodes so that said gate is normally closed and does not transmit forward current therethrough; and means to apply a gating pulse signal to said diodes in order to remove said reverse bias on said diodes and open said gate when an input signal is applied to said input terminal, including a gating pulse circuit whose output is connected to said diodes by a transformer with the primary winding of said transformer connected in series with said gating pulse circuit and a different secondary winding of said transformer connected in series with each of said diodes.

6. An operational amplifier ratchet memory circuit for storing electrical signals, comprising:

a vacuum tube having anode, cathode and grid electrodes connected as a cathode follower amplifier;

a first transistor having emitter, collector and base electrodes connected as a common emitter amplifier with its base connected to the cathode of said vacuum tube;

a second transistor having emitter, collector and base electrodes connected as a emitter follower amplifier with its base connected to the collector of said first transistor and its emitter connected to an output load impedance;

a memory capacitor connected from the emitter of said second transistor to the grid of said vacuum tube so that said capacitor functions as an input signal storage capacitor;

a coupling capacitor connected between the input terminal of said memory circuit and the grid of said vacuum tube;

a bypass diode connected from the base to the emitter of said second transistor to allow signals of one polarity to charge said memory capacitor faster than before;

a switching gate connected between said coupling capacitor and the grid of said vacuum tube to control the charging and discharging of said memory capacitor, said gate including a pair of diodes with the cathode of one and the anode of the other of said diodes connected to said grid, a source of substantially constant reverse bias voltage connected to each of said pair of diodes, and a biasing resistor connected to said voltage source and said coupling capacitor for charging and discharging said coupling capacitor as well as reverse biasing said diodes so that said gate is normally closed and does not transmit forward current therethrough; and means to apply a forward bias going gating pulse signal to said pair of diodes in order to remove said reverse bias on said diodes and open said gate when an input signal is applied to said input terminal.

7. An operational amplifier ratchet memory circuit for storing electrical signals, comprising:

a vacuum tube having anode, cathode and grid electrodes connected as a cathode follower amplifier;

a first transistor having emitter, collector and base electrodes connected as a common base amplifier with its emitter connected to the cathode of said vacuum tube and its base connected to a source of variable D.C. bias voltage;

a second transistor having emitter, collector and base electrodes connected as a common emitter amplifier with its base connected to the collector of said first transistor and its collector connected to an output load impedance;

a memory capacitor connected from the collector of said second transistor to the grid of said vacuum tube so that said capacitor functions as an input signal storage capacitor;

a coupling capacitor connected between the input terminal of said ratchet memory circuit and the grid of said vacuum tube so that the gain of said memory circuit is equal to the ratio of the capacitance of said coupling capacitor over that of said memory capacitor;

a switching gate connected between said coupling capacitor and the grid of said vacuum tube to control the charging and discharging of said capacitor, said gate including a pair of diodes with the cathode of one and the anode of the other of said pair of diodes connected to said grid, a diode biasing resistor connected between said coupling capacitor and said diodes which also functions as a timing resistor for charging and discharging said coupling capacitor, and a source of substantially constant reverse bias voltage connected to each of said pair of diodes so that said gate is normally closed and does not transmit forward current therethrough; and means to apply a forward bias going gating pulse signal to said pair of diodes in order to remove said reverse bias on said diodes and open said gate when an input signal is applied to said input terminal.

8. An electrical signal sampling circuit for reproducing the waveform of a high frequency input signal at a lower frequency, comprising:

sampling means for transmitting a sample pulse therefrom whose voltage is related to that of a portion of a repetitive input signal applied to said sampling means in response to an interrogating signal pulse, said sampling means including a sampling gate which is quiescently biased closed so that said sample pulse cannot pass through said sampling gate until said interrogating pulse is applied thereto;

pulse generator means for generating a memory gating pulse and an interrogating signal pulse by triggering in response to said input signal and varying the time of generation of said gating pulse and said interrogating pulse with respect to said input signal so that subsequent gating pulses and interrogating pulses are produced at different times with respect to their generating input signals, said pulse generator means being connected to said sampling gate to apply said interrogating pulse to said sampling gate in order to open said sampling gate to allow a sample portion of said input signal to pass through said sampling gate from its input terminal to its output terminal as said sample pulse, each sample pulse being taken from a different portion of the waveform of a different one of successive input signals;

ratchet memory means for adding and storing the difference of successive sample pulses to produce an output signal having a similar waveform as said input signal but being of a lower frequency, said memory means including a voltage inverter amplifier having an integrator capacitor connected between its output and input and having a coupling capacitor connected between its input and the output terminal of said sampling gate means; and said memory means including a memory gate connected between said coupling capacitor and said input of said inverter amplifier, said memory gate being quiescently biased closed so that signal current will not flow therethrough except when said gating pulse is applied by said pulse generator means to the memory gate to open said memory gate at a time related to the transmission of said sample pulse through said sampling gate.

9. An electrical signal sampling circuit for reproducing the waveform of a high frequency input signal at a lower frequency comprising:

sampling means for transmitting a sample portion of a repetitive input signal applied thereto in response to an interrogating signal pulse, said sampling means including a sampling gate which is quiescently biased closed so that said input signal cannot pass through said sampling gate until said interrogating pulse is applied thereto;

pulse generator means for generating a plurality of interrogating signal pulse and memory gating pulses by triggering in response to said input signal and varying the time of generation of said interrogating pulses and said gating pulses with respect to said input signal so that subsequent interrogating pulses and gating pulses are delayed with respect to their generating input signals, said generator means being connected to said sampling gate to apply said interrogating pulse to said sampling gate in order to render said sampling gate conducting by the application of said interrogating pulses and to allow a sample portion of said input signal to pass through said sampling gate from its input terminal to its output terminal, each sample portion being taken from a different portion of the waveform of a different one of successive input signals;

ratchet memory means for adding and storing the voltage difference of successive sample portions to produce an output signal having substantially the same waveform as said input signal but being of a lower frequency, by comparing each subsequent sample portion with the sum of previous sample portions to determine whether said amplitude difference is positive or negative, said memory means including a hybrid Miller integrator circuit having a vacuum tube input stage and a transistor output stage and a memory capacitor connected to provide negative voltage feedback and having it connected through a coupling capacitor to the output terminal of said sampling gate;

a feedback impedance connected from the output end of said integrator circuit to said output terminal of said sampling gate; and memory gate means for controlling said ratchet memory means, including a memory gate connected to said pulse generator means and connected between said coupling capacitor and said input end of said integrator circuit which memory gate is normally closed by reverse biasing so that forward current will not flow therethrough except when said gating pulse is applied to said memory gate by said pulse generator means to open said memory gate at a time related to the transmission of said sample portion of said input signal through said sampling gate.

10. An electrical signal sampling circuit for reproducing the waveform of a high frequency input signal at a lower frequency, comprising:

sampling means for transmitting a sample portion of a repetitive input signal applied thereto in response to an interrogating signal pulse, said sampling means including a sampling gate which is quiescently biased closed so that an input signal cannot pass through said sampling gate;

pulse generator mean for generating a memory gating pulse and an interrogating signal pulse by triggering in response to said input signal and varying the time of generation of said gating pulse and said interrogating pulse with respect to said input signal so that subsequent gating pulses and interrogating pulses are delayed with respect to their generating input signals, said generating means being connected to said sampling gate to apply said interrogating pulse to said sampling gate in order to open said sampling gate and to allow a sample portion of said input signal to pass through said sampling gate from its input terminal to its output terminal each sample portion being taken from a different portion of the waveform of a different one of successive input signals;

amplifier means connected to the output of said bridge gate for amplifying the voltage of said sample portion of said input signal transmitted through said sampling gate;

ratchet memory means connected to the output of said amplifier means for adding and storing the amplitude difference of successive sample portions after to produce an output signal having a similar waveform as said input signal but being of a lower frequency, by comparing each subsequent sample portion with the sum of previous sample portions to determine whether said amplitude difference is positive or negative, said memory means including a hybrid Miller integrator circuit having a vacuum tube connected as a cathode follower amplifier and a transistor connected as common emitter amplifier to the output of said cathode follower with a memory capacitor connected to provide negative voltage feedback from the output to the input of said integrator circuit and having the input of said integrator circuit connected through a coupling capacitor to the output of said amplifying means;

a feedback circuit connected from the output of said Miller integrator to said output terminal of said sampling gate; and memory gate means for controlling said ratchet memory means, including a diode memory gate connected to said pulse generator means and connected between said coupling capacitor and said input of said Miller integrator, and a biasing resistor connected to said coupling capacitor and to the diodes of said memory gate so that it functions as a timing resistor for charging and discharging said coupling capacitor and also to reverse bias the diodes of said memory gate quiescently closed so that current will not flow therethrough except when a gating pulse is applied to said memory gate by said pulse generator means to open said memory gate related in time to the transmission of said sample portion of said input signal through said bridge gate.

11. An electrical signal sampling circuit for reproducing the waveform of a high frequency signal at a lower frequency, comprising:

sampling gate means for transmitting a portion of a repetitive input signal in response to an interrogating signal pulse, including a bridge gate containing at least four diodes which are quiescently reverse voltage biased so that said bridge gate is normally closed and an input signal cannot pass through said bridge gate from its input terminal to its output terminal;

pulse generator means for generating a memory gating pulse and an interrogating signal pulse by triggering in response to said input signal and varying the time of generation of said gating pulse and said interrogating pulse with respect to said input signal so that subsequent gating pulses and interrogating pulses are delayed with respect to their generating input signals, said generating means being connected to said bridge gate to apply interrogating pulses of opposite phase to the opposite side terminals of said bridge gate remote from said input and output terminals in order to open said bridge gate by forward biasing said four diodes and to allow a sample portion of said input signal to pass through said bridge gate from its input terminal to its output terminal, each sample portion being taken from a different portion of the waveform of a different one of successive input signals means;

for amplifying said sample portion of said input signal transmitted through said bridge gate;

ratchet memory means for adding and storing the amplitude difference of successive sample portions to produce an output signal having a waveform similar to said input signal but being of a lower frequency, by comparing each subsequent sample portion with the sum of previous sample portions to determine whether said amplitude difference is positive or negative, said memory means including a hybrid Miller integrator type circuit having a vacuum tube input stage connected as a cathode follower amplifier and a transistor output stage and a memory capacitor feedback and connected at its input end through a coupling capacitor to the output end of said amplifying means;

a feedback impedance connected from the output end of said Miller circuit to said output terminal of said bridge gate; and memory gate means for controlling said ratchet memory means, including a memory gate connected to said pulse generator means by a transformer and containing at least two diodes connected of opposite polarity between said coupling capacitor and said input end of said Miller circuit, and a biasing resistor connected to said coupling capacitor and said memory gate so that it functions as a timing resistor for charging and discharging said coupling capacitor and also to quiescently reverse bias said two diodes so that said memory gate is normally closed so that current will not flow therethrough except when said gating pulse is applied to said two diodes by said pulse generator means to forward bias said two diodes and to open said memory gate related in time to the transmission of said sample portion of said input signal through said bridge gate.

12. A sampling circuit for reproducing the waveform of a repetitive high frequency electrical signal at a lower frequency, comprising:

a sampling gate normally biased nonconducting and connected so that a sample portion of a repetitive high frequency input signal applied to the input terminal of said sampling gate, is transmitted to the output terminal of said sampling gate when said sampling gate is rendered conducting;

means for generating interrogating pulses in response to said input signals and for applying interrogating pulses to said sampling gate at times related to the application of successive wave forms of said input signal to said sampling gate but differing with respect to the portion of the waveform then applied, in order to render said sampling gate briefly conducting for a time determined by the width of said interrogating pulse to transmit a sample portion of the waveform of said input signal through said sampling gate, each sample portion being taken from a different portion of the waveform of different ones of successive input signals;

a memory circuit including an integrator amplifier circuit having a memory capacitor connected as a negative voltage feedback from the output to the input of a voltage inverter amplifier in said integrator amplifier circuit, and including a coupling capacitor connected between the output terminal of said sampling gate and said input of said inverter amplifier;

a memory gate means normally biased non-conducting and connected between said coupling capacitor and said memory capacitor to control the charging and discharging of said memory capacitor by said sample portions to produce an output signal having a waveform similar to said input signal but being of a lower frequency; and means for generating gating pulses in response to said input signals and for applying a gating pulse to said memory gate at a time related to the application of said interrogating pulse to render said memory gate means conducting for a length of time determined by the width of said gating pulse.

References Cited by the Examiner

UNITED STATES PATENTS

| | | | |
|---|---|---|---|
| 2,562,792 | 7/1951 | James | 328—127 |
| 2,781,445 | 2/1957 | Stocker | 328—128 |
| 2,907,878 | 10/1959 | Young et al. | 235—197 |
| 3,003,094 | 11/1961 | Trimmer | 235—183 |
| 3,011,129 | 11/1961 | Magleby et al. | 307—88.5 |
| 3,091,738 | 5/1963 | Relis et al. | 324—146 |

ARTHUR GAUSS, *Primary Examiner.*

GEORGE N. WESTBY, *Examiner.*